US012730092B2

(12) United States Patent
Teraguchi et al.

(10) Patent No.: US 12,730,092 B2
(45) Date of Patent: Sep. 8, 2026

(54) QUALITY EVALUATION METHOD AND QUALITY EVALUATION DEVICE

(71) Applicant: Nissan Motor Co., Ltd., Kanagawa (JP)

(72) Inventors: Takehito Teraguchi, Kanagawa (JP); Hiroshi Kasai, Kanagawa (JP); Yusuke Takayama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/632,052

(22) PCT Filed: Apr. 22, 2021

(86) PCT No.: PCT/JP2021/016345
§ 371 (c)(1),
(2) Date: Oct. 27, 2022

(87) PCT Pub. No.: WO2022/224414
PCT Pub. Date: Oct. 27, 2022

(65) Prior Publication Data
US 2024/0019401 A1 Jan. 18, 2024

(51) Int. Cl.
*G01N 29/04* (2006.01)
*G01N 29/44* (2006.01)
(Continued)

(52) U.S. Cl.
CPC ......... *G01N 29/04* (2013.01); *G01N 29/4472* (2013.01); *G01N 29/46* (2013.01);
(Continued)

(58) Field of Classification Search
CPC .... G01N 29/04; G01N 29/4472; G01N 29/46; G01N 29/48; G01N 2291/0289;
(Continued)

(56) References Cited

U.S. PATENT DOCUMENTS

2003/0118149 A1* 6/2003 Okuda ................. G01N 23/225 378/58
2009/0066939 A1 3/2009 Venkatachalam et al.
(Continued)

FOREIGN PATENT DOCUMENTS

CN 103380057 A 10/2013
CN 104749200 A 7/2015
(Continued)

OTHER PUBLICATIONS

Zaki A, Chai HK, Aggelis DG, Alver N. Non-Destructive Evaluation for Corrosion Monitoring in Concrete: A Review and Capability of Acoustic Emission Technique. Sensors (Basel). Aug. 5, 2015;15(8):19069-101 (Year: 2015).*
(Continued)

*Primary Examiner* — Catherine T. Rastovski
(74) *Attorney, Agent, or Firm* — Osha Bergman Watanabe & Burton LLP

(57) ABSTRACT

A quality evaluation device operates to: detect a defect present in a component based on a detection result obtained by a non-destructive inspection method; extract feature amounts of the defect from detection information of the defect; specify an evaluation target site in which the defect is present in the component; acquire one or more usage state information values associated with the evaluation target site, the usage state information values being estimated values that represent physical characteristics of the evaluation target site when the component is used; and determine, based at least on the feature amounts and the one or more usage state information values, whether or not the defect is an aggressive defect.

15 Claims, 5 Drawing Sheets

(51) Int. Cl.
*G01N 29/46* (2006.01)
*G01N 29/48* (2006.01)
*G06T 19/20* (2011.01)

(52) U.S. Cl.
CPC ............. *G01N 29/48* (2013.01); *G06T 19/20* (2013.01); *G01N 2291/0289* (2013.01); *G06T 2200/24* (2013.01); *G06T 2219/2004* (2013.01)

(58) Field of Classification Search
CPC ........ G01N 23/04; G01N 23/18; G06T 19/20; G06T 2200/24; G06T 2219/2004; G06T 2207/30164; G06T 7/0004
See application file for complete search history.

(56) References Cited

U.S. PATENT DOCUMENTS

2011/0270537 A1* 11/2011 Wong ................. G01N 29/4445 702/35
2013/0261876 A1* 10/2013 Froom ...................... B64F 5/00 901/44
2015/0134274 A1 5/2015 Froom et al.
2016/0318632 A1 11/2016 Froom et al.
2017/0241919 A1 8/2017 Machii et al.
2019/0195811 A1 6/2019 Machii et al.
2020/0118263 A1* 4/2020 Nogami ................ G06T 7/0004

FOREIGN PATENT DOCUMENTS

CN 107076683 A 8/2017
JP 2006-105794 A 4/2006
JP 2006189349 A 7/2006
JP 2019023649 * 2/2019
KR 20110019676 * 2/2011 ............. G01N 25/72
KR 20110019676 A 2/2011
RU 2531428 * 10/2014

OTHER PUBLICATIONS

Usamentiaga R, Venegas P, Guerediaga J, Vega L, Molleda J, Bulnes FG. Infrared thermography for temperature measurement and non-destructive testing. Sensors (Basel). Jul. 10, 2014;14(7):12305-48 (Year: 2014).*

* cited by examiner

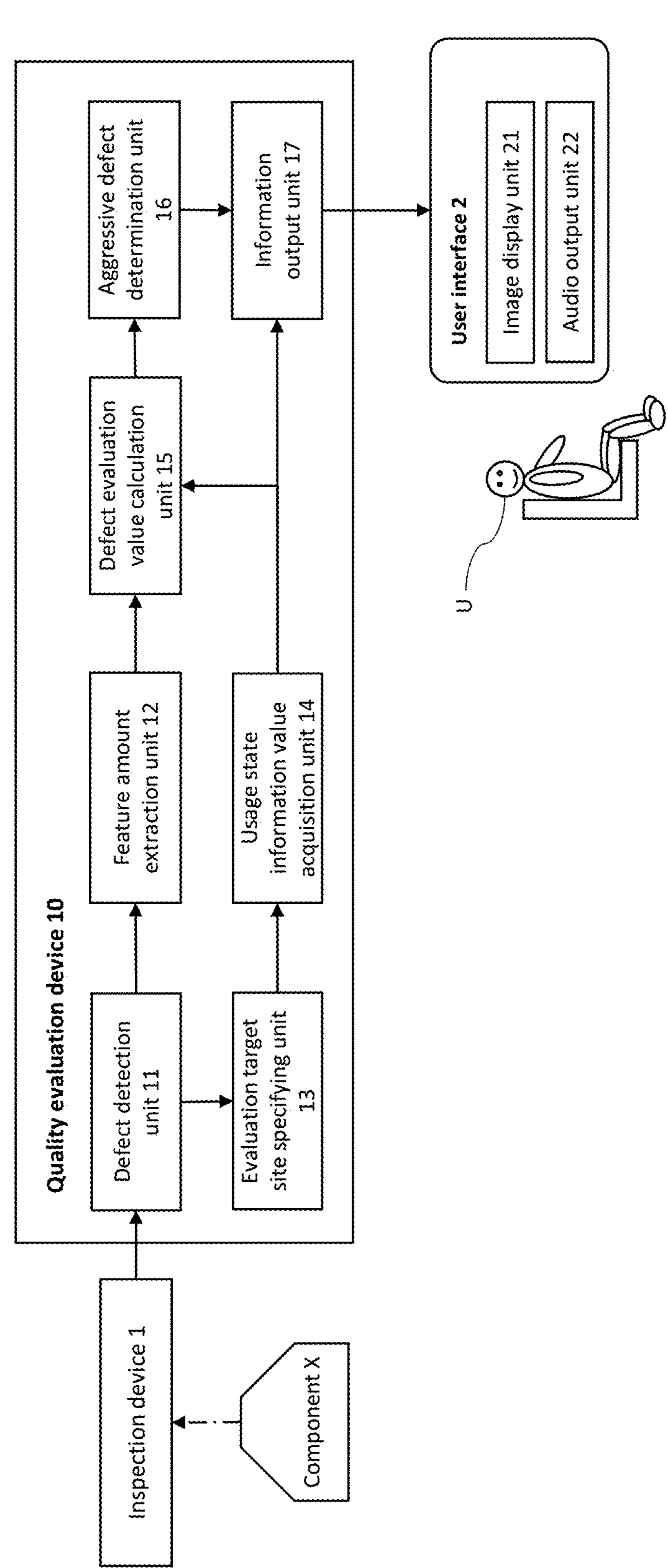
FIG. 1
Inspection device 1
Component X
Quality evaluation device 10
Defect detection unit 11
Feature amount extraction unit 12
Evaluation target site specifying unit 13
Usage state information value acquisition unit 14
Defect evaluation value calculation unit 15
Aggressive defect determination unit 16
Information output unit 17
User interface 2
Image display unit 21
Audio output unit 22
U

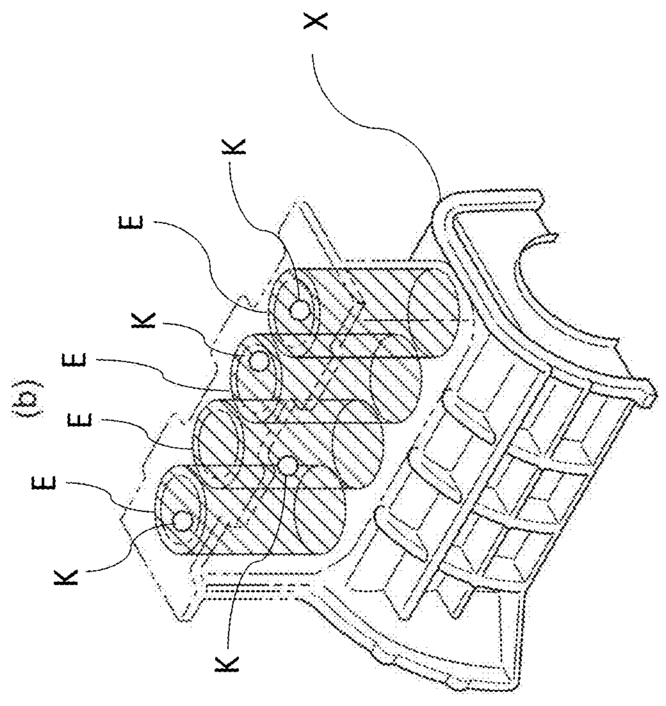
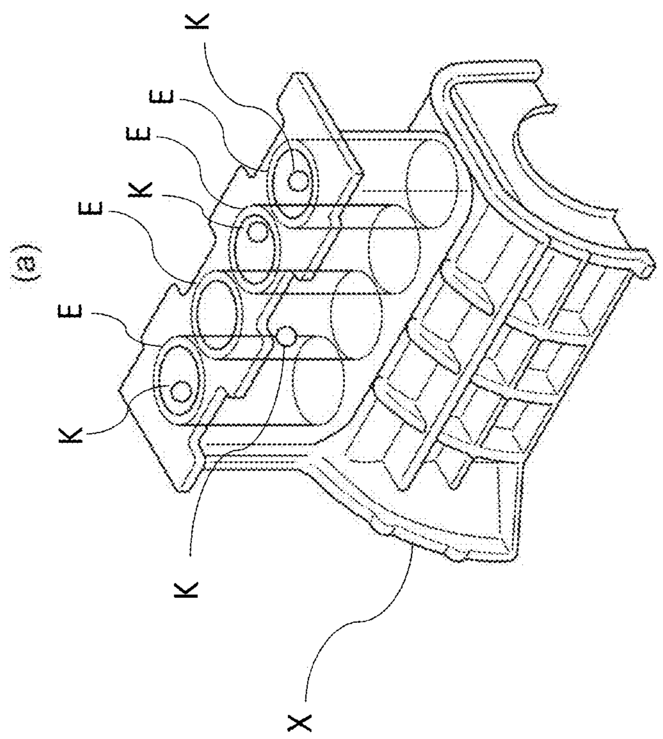
FIG. 4

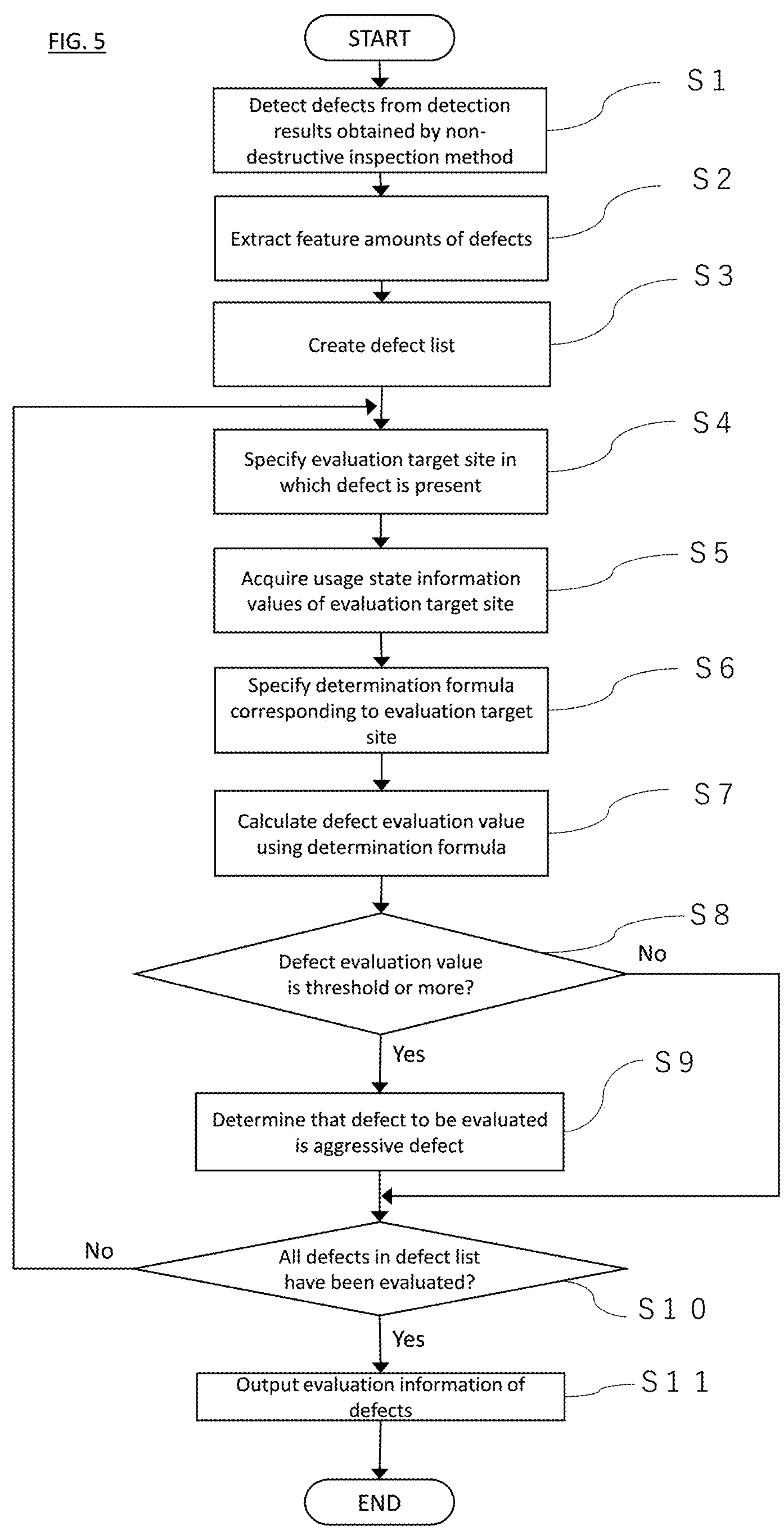
FIG. 5
START
Detect defects from detection results obtained by non-destructive inspection method
S1
Extract feature amounts of defects
S2
Create defect list
S3
Specify evaluation target site in which defect is present
S4
Acquire usage state information values of evaluation target site
S5
Specify determination formula corresponding to evaluation target site
S6
Calculate defect evaluation value using determination formula
S7
Defect evaluation value is threshold or more?
S8
No
Yes
Determine that defect to be evaluated is aggressive defect
S9
All defects in defect list have been evaluated?
No
S10
Yes
Output evaluation information of defects
S11
END

QUALITY EVALUATION METHOD AND QUALITY EVALUATION DEVICE

TECHNICAL FIELD

The present invention relates to a quality evaluation method and a quality evaluation device for evaluating the quality of a component.

BACKGROUND ART

Patent Document 1 describes a quality evaluation device, which evaluates the quality of a component through inspecting the component using transmitted X-rays to obtain an inspection result and comparing the obtained inspection result with a detection result when the component has zero defects.

PRIOR ART DOCUMENT

Patent Document

[Patent Document 1] JP2006-105794A

SUMMARY OF INVENTION

Problems to be Solved by Invention

However, the quality evaluation device described in Patent Document 1 does not evaluate the quality of a component in accordance with the usage state of the component and therefore has a problem in that the accuracy of quality evaluation is low.

A problem to be solved by the present invention is to provide a quality evaluation method and a quality evaluation device for evaluating the quality of a component in accordance with the usage state of each site.

Means for Solving Problems

The present invention solves the above problem through extracting one or more feature amounts from detection information of a defect obtained by a non-destructive inspection method, specifying an evaluation target site in which the defect is present, acquiring one or more usage state information values associated with each of evaluation target sites, and determining, based at least on the one or more feature amounts and the one or more usage state information values, whether or not the defect is an aggressive defect.

Effect of Invention

According to the present invention, a determination is made whether or not the defect is an aggressive defect in accordance with the usage state information value or values of the site in which the defect is present, and it is therefore possible to evaluate the quality of the component in accordance with the usage state of each site.

BRIEF DESCRIPTION OF DRAWINGS

FIG. 1 is a block diagram illustrating the configuration of a quality evaluation device according to one or more embodiments of the present invention.

FIGS. 4(*a*) and 4(*b*) are diagrams illustrating examples of image information that is output by an information output unit of the quality evaluation device illustrated in FIG. 1.

FIG. 5 is a flowchart illustrating a procedure of a quality evaluation method for a component executed by the quality evaluation device according to one or more embodiments of the present invention.

MODE(S) FOR CARRYING OUT THE INVENTION

Figure 2:
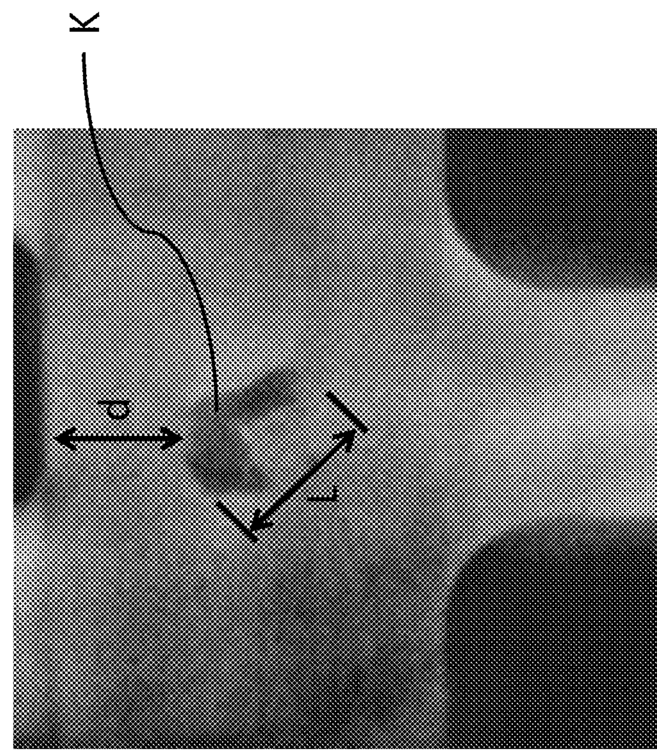
FIG. 2 is a photograph showing an example of a defect subjected to quality evaluation by the quality evaluation device according to one or more embodiments of the present invention.

Hereinafter, one or more embodiments of the present invention will be described with reference to the drawings.

As illustrated in FIG. 1, quality evaluation device 10 evaluates the quality of a component X based on detection results of the component X which an inspection device 1 acquires by executing a non-destructive inspection method. The non-destructive inspection method executed by the inspection device 1 is an X-ray inspection method (radiation transmission method), but the method is not limited to this and may also be an inspection method using ultrasonic waves, MRI (magnetic resonance imaging method), eddy currents, thermography, or near-infrared spectroscopy. That is, the non-destructive inspection method is an inspection method capable of inspecting the component X without damaging it. The component X is, for example, a cast product such as a cylinder block of a vehicle engine. When the component X is a cast product, the component X is formed, for example, of cast iron, steel, an aluminum alloy, a copper alloy, a magnesium alloy, a zinc alloy, a nickel alloy, a titanium alloy, or the like. The component X is not limited to a cast product and may be, for example, a resin component.

The quality evaluation device 10 outputs the results of the quality evaluation of the component X to a user interface 2 and presents information to a user U. The user interface 2 has an image display unit 21 that visually displays image information and an audio output unit 22. The image display unit 21 is, for example, a monitor. The audio output unit 22 is, for example, a speaker.

The quality evaluation device 10 has a defect detection unit 11, a feature amount extraction unit 12, an evaluation target site specifying unit 13, a usage state information value acquisition unit 14, a defect evaluation value calculation unit 15, an aggressive defect determination unit 16, and an information output unit 17. The defect detection unit 11, the feature amount extraction unit 12, the evaluation target site specifying unit 13, the usage state information value acquisition unit 14, the defect evaluation value calculation unit 15, the aggressive defect determination unit 16, and the information output unit 17 execute programs for realizing respective functions of the quality evaluation device 10.

The defect detection unit 11 of the quality evaluation device 10 detects one or more defects present in the component X based on the detection results obtained by the non-destructive inspection method which the inspection device 1 executes. The detection results obtained by the non-destructive inspection method are, for example, three-dimensional volume data (intensity distribution data) of the component X. Additionally or alternatively, the detection results obtained by the non-destructive inspection method include a set of cross-sectional data pieces of the component X. The defect detection unit 11 detects defects present in the component X based on the detection results obtained by the non-destructive inspection method. The defects detected by the defect detection unit 11 include, for example, a cavity (blow hole) generated in a cast product, such as a defect K illustrated in FIG. 2. The defects may also include a crack generated in a cast product or a foreign substance mixed in a cast product. The defects include those that may cause a problem during the use of the component X, thus being aggressive (aggressive defects) and those that may not cause problems, thus being non-aggressive (non-aggressive defects). That is, if the defect is not an aggressive defect, there is no possibility of causing a problem in the process of using the component X.

Figure 3:
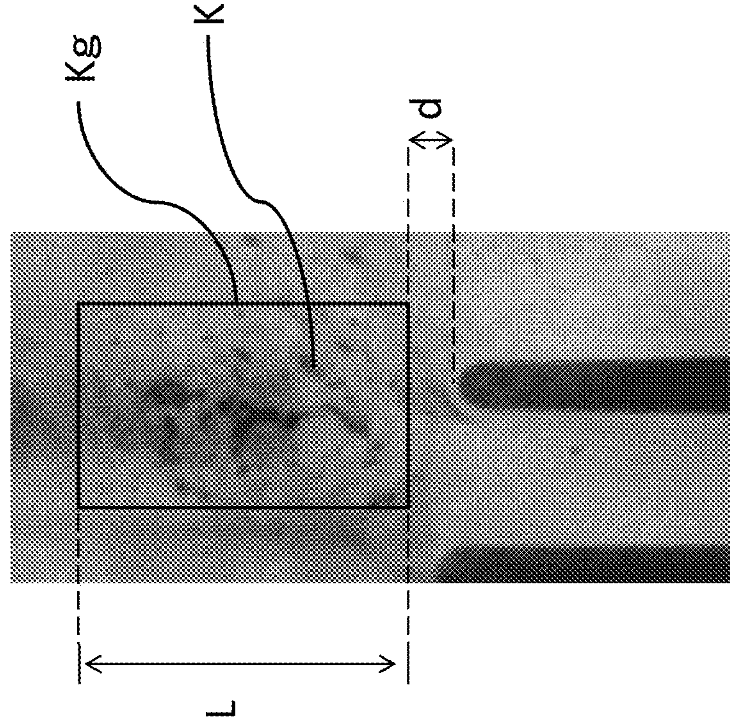
FIG. 3 is a photograph showing an example of a set of defects subjected to quality evaluation by the quality evaluation device according to one or more embodiments of the present invention.

Additionally or alternatively, as illustrated in FIG. 3, the defect detection unit 11 specifies a defect group Kg in which the density of a plurality of defects K is a predetermined value or more, and detects the defect group Kg as a defect. In the example of FIG. 3, the defects K are cavities (blow holes), and the defect group Kg is a portion in which the cavities are gathered. Specifically, the defect detection unit 11 divides the three-dimensional data of the component X into a plurality of unit regions (e.g., three-dimensional regions of 1 $cm^3$) and calculates the density (distribution) of the defects K per unit region. Then, the defect detection unit 11 specifies, as the defect group Kg, a region in which the density of the defects K per unit region is a predetermined value or more. This "predetermined value" is a threshold that is preliminarily determined based on experiments and/or simulations depending on whether or not the defects K may be combined with each other to form a larger defect in the future due to the aging deterioration of the component X.

In addition, the feature amount extraction unit 12 extracts one or more feature amounts from the detection information of a defect. The feature amounts of a defect refer to values that represent physical information of the defect. The feature amounts of a defect include, for example, a volume V of the defect, a length L of the defect, and a depth d that is the shortest distance from the surface of the component X to the position of the defect. That is, the feature amount extraction unit 12 extracts the feature amounts based at least on one of the position and size of a defect.

In the example illustrated in FIG. 2, the feature amount extraction unit 12 extracts the largest width L of the defect K (length L of the defect K) as a feature amount based on the three-dimensional shape of the defect K and the shape of the cross section of the defect K. Additionally or alternatively, the feature amount extraction unit 12 extracts the shortest distance d between the surface of the component X and the defect K (depth d of the position of the defect K from the surface of the component X) as a feature amount. The surface of the component X, which serves as a reference for extracting the depth d of the position of the defect K, is the surface closest to the defect K, but the surface is not limited to this and may be the surface of a site in which the amount of wear is estimated to be the largest when the component X is used. Additionally or alternatively, the surface of the component X, which serves as a reference for extracting the depth d of the position of the defect K, may be a surface exposed to the outside of the component X or may also be a contact surface with another component. Additionally or alternatively, the surface of the component X may be the inner surface of a screw hole threaded by tapping to fasten a bolt. Additionally or alternatively, the surface of the component X may be the inner surface of an oil flow path, a cooling water flow path, or the like.

In the example illustrated in FIG. 3, the feature amount extraction unit 12 extracts the largest width L (length L of the defect group Kg) of the region occupied by the defect group Kg as a feature amount of the defect. Additionally or alternatively, the feature amount extraction unit 12 extracts the shortest distance d between the surface of the component X and a defect K (depth d of the position of the defect K from the surface of the component X) as a feature amount. Additionally or alternatively, the feature amount extraction unit 12 extracts a density p of defects K included in the defect group Kg as a feature amount of the defect. The density p of the defects K extracted as a feature amount is the average or median of the density of the defects K per unit region in the region occupied by the defect group Kg. The feature amount extraction unit 12 may calculate the density of the defects K as a feature amount of the defect by dividing the number of the defects K by the volume of the region occupied by the defect group Kg.

When the defect detected by the defect detection unit 11 is a crack, the feature amount extraction unit 12 may extract the distance between the surface of the component X and the central portion of the crack as the depth d of the position of the defect. The feature amount extraction unit 12 may acquire a plurality of arbitrary points along the crack and extract the average or median of the distances between the surface of the component X and respective points as the depth d of the position of the defect.

Additionally or alternatively, the feature amount extraction unit 12 may extract the feature amount of a defect on the assumption that the component X is subjected to a predetermined process. Specifically, the feature amount extraction unit 12 may extract the depth d of the position of a defect from the surface of the component X on the assumption that a process of grinding the surface of the component to thin it is performed as the feature amount of the defect.

In addition, the evaluation target site specifying unit 13 of the quality evaluation device 10 illustrated in FIG. 1 specifies an evaluation target site E in which a defect is present in the component X. Specifically, the evaluation target site specifying unit 13 divides the three-dimensional data of the component X into a plurality of evaluation target sites E in accordance with the structure and the type/mode of the load applied during the use and specifies in which evaluation target site E the detected defect is present. Specifically, when the component X is a cylinder block of the engine of a vehicle, the evaluation target site specifying unit 13 recognizes a site in which an oil flow path is provided, a site in which a cooling water flow path (water jacket) is provided, a site connected to a cylinder head, a site connected to the radiator, and the like as different evaluation target sites E and specifies in which evaluation target site E the defect is present.

In addition, the usage state information value acquisition unit 14 acquires one or more usage state information values associated with an evaluation target site E. The usage state information values are each an estimated value that represents the physical characteristics of an evaluation target site E when the component X is used. That is, the usage state information values are each a value that indicates the degree of load applied to an evaluation target site E when the component X is used. Specifically, the one or more usage state information values are one or more of an estimated pressure (p) applied to an evaluation target site E when the component X is used, an estimated stress (F) generated in the evaluation target site E when the component X is used, a frequency (f) of predicted vibration of the evaluation target site E when the component X is used, an amplitude (A) of the predicted vibration, and an estimated temperature (t) of the evaluation target site E when the component X is used. The usage state information value acquisition unit 14 refers to a list stored in a database (not illustrated) of the quality evaluation device 10 thereby to acquire one or more usage state information values associated with an evaluation target site E. Additionally or alternatively, when the component X includes a defect, the usage state information value acquisition unit 14 may create a virtual model of the component X and acquire the usage state information values based on the simulation results obtained by simulating the usage state of the virtual model. The virtual model of the component X is, for example, the three-dimensional shape data of the component X created by 3D CAD. Additionally or alternatively, the usage state information value acquisition unit 14 may acquire the usage state information values associated with an evaluation target site E by using a trained model that is learned by teacher data in which the evaluation target site E and the usage state information values are associated with each other.

The defect evaluation value calculation unit 15 calculates a defect evaluation value B of the defect based on the feature amounts extracted by the feature amount extraction unit 12 and the usage state information values acquired by the usage state information value acquisition unit 14. Specifically, the defect evaluation value calculation unit 15 substitutes the feature amounts and the usage state information values into a determination formula associated with an evaluation target site E and multiplies the value calculated by the substitution by a normalization constant thereby to calculate the defect evaluation value B of the defect.

A load time T at which any of the usage state information values becomes a predetermined value or more within a predetermined period of use of the component X may be substituted into the determination formula associated with an evaluation target site E. The load time T is, for example, an accumulated time obtained by accumulating a time during which a usage state information value is estimated to be a predetermined value or more within a warranty period of the component X. Additionally or alternatively, the load time T may be, for example, a time during which a usage state information value is estimated to be a predetermined value or more for one-hour use of the component X. The above "predetermined value" is a value to be a reference for determining whether or not the defect of an evaluation target site E is affected by any of the estimated pressure (p), the estimated stress (F), the frequency (f) of the predicted vibration, the amplitude (A) of the predicted vibration, and the estimated temperature (t). For example, the longer the load time T at which the estimated pressure (p) in an evaluation target site E becomes the predetermined value or more, the larger the size of the defect or the higher the possibility that the defect causes a new crack.

Examples of a method of calculating the defect evaluation value B of a defect will be described below. In the following Formulae (1) to (8), the right-side terms are each a term for determination that is associated with the type (identification information) of an evaluation target site E. Formulae (1) to (8) each indicate that the defect evaluation value B is calculated by multiplying the right-side term or terms for determination by a normalization constant. In the following Formulae (1) to (8), the higher the defect evaluation value B, the higher the aggressive level of the defect. The present invention is not limited to this, and the defect evaluation value calculation unit 15 may set the determination formulae such that the higher the defect evaluation value B, the lower the aggressive level of the defect.

For example, when the component X is a cylinder block and the evaluation target site E is a site including an oil flow path, the defect evaluation value B is calculated based on the feature amounts of a defect (the volume V of the defect, the length L of the defect, and the depth d of the position of the defect from the surface of component X), the usage state information values (the amplitude A of the predicted vibration and the frequency f of the predicted vibration), and the load time T, as represented by the following Formula (1). The load time T is a time at which the amplitude A of the predicted vibration becomes a predetermined value or more, or a time at which the frequency f of the predicted vibration becomes a predetermined value or more, within a predetermined period of use of the component X. That is, in the following Formula (1), the higher the value of the volume V of the defect, the length L of the defect, the amplitude A of the predicted vibration, the frequency f of the predicted vibration, or the load time T, the higher the defect evaluation value B. On the other hand, the smaller the depth d of the position of the defect from the surface of the component X, the higher the defect evaluation value B, for example, because the size of the defect expands due to the aging deterioration and the probability of the occurrence of a problem increases that the oil leaks to the surface of the component X through the defect.

[Formula 1]

$$B \propto A*f*T*V*L*1/d \tag{1}$$

When the component X is a cylinder block, the evaluation target site E is a site including an oil flow path, and the defect detection unit 11 detects the defect group Kg as illustrated in FIG. 3 as a defect, the defect evaluation value calculation unit 15 calculates the defect evaluation value B using the following Formula (2). That is, the right-side term for determination of Formula (2) is a term obtained by multiplying the term for determination of Formula (1) by the squared value of the density ρ of the defects K included in the defect group Kg. In the following Formula (2), the larger the value of the density ρ of the defects K included in the defect group Kg, the higher the defect evaluation value B.

[Formula 2]

$$B \propto A*f*T*V*L*1/d*\rho^2 \tag{2}$$

When the component X is a cylinder block and the evaluation target site E is a site including a fluid flow path that is a cooling water flow path (water jacket) for cooling a cylinder (sliding portion of a piston), the defect evaluation value calculation unit 15 calculates the defect evaluation value B using the following Formula (3). That is, the defect evaluation value B is calculated based on the feature amounts of a defect (the volume V of the defect, the length L of the defect, and the depth d of the position of the defect from the surface of component X), the usage state information values (the estimated temperature t and the estimated pressure p), and the load time T, as represented by the following Formula (3). In this example, the estimated pressure p is the water pressure of the water flowing through the cooling water flow path. The load time T is a time at which the estimated temperature t of the evaluation target site E becomes a predetermined value or more, or a time at which the estimated pressure p becomes a predetermined value or more, within a predetermined period of use of the component X. That is, in the following Formula (3), the higher the value of the volume V of the defect, the length L of the defect, the estimated temperature t, the estimated pressure p, or the load time T, the higher the defect evaluation value B. On the other hand, the smaller the depth d of the position of the defect from the surface of the component X, the higher the defect evaluation value B. When the evaluation target site E includes an oil flow path as the fluid flow path, the quality evaluation device 10 may acquire the estimated pressure p of the oil flowing through the oil flow path as a usage state information value and calculate the defect evaluation value B higher as the estimated pressure p is higher.

[Formula 3]

$$B \propto t*T*p*V*L*1/d \quad (3)$$

When the component X is a cylinder block, the evaluation target site E is a site including a cooling water flow path for cooling a cylinder, and the defect detection unit 11 detects the defect group Kg as illustrated in FIG. 3 as a defect, the defect evaluation value calculation unit 15 calculates the defect evaluation value B using the following Formula (4). That is, the right-side term for determination of Formula (4) is a term obtained by multiplying the term for determination of Formula (3) by the density ρ of the defects K included in the defect group Kg. In the following Formula (4), the larger the value of the density ρ of the defects K included in the defect group Kg, the higher the defect evaluation value B.

[Formula 4]

$$B \propto t*T*\rho*\rho*V*L*1/d \quad (4)$$

When the component X is a cylinder block and the evaluation target site E is a site including a connection portion by bolt joining with another component (such as a cylinder head or a radiator), the defect evaluation value B is calculated based on the feature amounts of a defect (the volume V of the defect, the length L of the defect, and the depth d of the position of the defect from the surface of component X), the usage state information values (the estimated stress F, the amplitude A of the predicted vibration, and the frequency f of the predicted vibration), and the load time T, as represented by the following Formula (5). The terms for determination used in Formula (5) are terms obtained by adding the estimated stress F to the term for determination used in Formula (1). In this example, the estimated stress is the stress generated in the evaluation target site E by fastening the bolt to a screw hole formed in the evaluation target site E (bolt joining). That is, the terms for determination used in Formula (5) are terms that are set with consideration for the possibility that a new defect such as a crack (tissue fracture) will occur from an originally existing defect, for example, due to the stress generated by the bolt joining and the vibration during the use of the component X. The load time T is a time at which the amplitude A of the predicted vibration becomes a predetermined value or more, or a time at which the frequency f of the predicted vibration becomes a predetermined value or more, within a predetermined period of use of the component X. That is, in the following Formula (5), the higher the value of the volume V of the defect, the length L of the defect, the estimated stress F, the amplitude A of the predicted vibration, the frequency f of the predicted vibration, or the load time T, the higher the defect evaluation value B. On the other hand, the smaller the depth d of the position of the defect from the surface of the component X, the higher the defect evaluation value B.

[Formula 5]

$$B \propto F+A*f*T*V*L*1/d \quad (5)$$

When the component X is a cylinder block, the evaluation target site E is a site including a connection portion by bolt joining with another component, and the defect detection unit 11 detects the defect group Kg as illustrated in FIG. 3 as a defect, the defect evaluation value calculation unit 15 calculates the defect evaluation value B using the following Formula (6). That is, the right-side terms for determination of Formula (6) are terms obtained by multiplying the portion of "A×f×T×V×L×1/d" included in the terms for determination of Formula (5) by the squared value of the density ρ of the defects K included in the defect group Kg. In the following Formula (6), the larger the value of the density ρ of the defects K included in the defect group Kg, the higher the defect evaluation value B.

[Formula 6]

$$B \propto F+A*f*T*V*L*1/d*\rho^2 \quad (6)$$

When the component X is a cylinder block and the evaluation target site E is a site that receives a large vibration, such as a portion having a cylinder (cylinder liner), the defect evaluation value B may be calculated based on the feature amounts of a defect (the volume V of the defect, the length L of the defect, and the depth d of the position of the defect from the surface of component X), the usage state information values (the estimated stress F, the amplitude A of the predicted vibration, and the frequency f of the predicted vibration), the load time T, and a thickness a of the component X, for example, as represented by the following Formula (7). That is, in the following Formula (7), the smaller the thickness a of the component X, the higher the defect evaluation value B, because the possibility becomes high that a new defect such as a crack (tissue fracture) will occur from an originally existing defect due to the vibration during the use of the component X.

[Formula 7]

$$B \propto A*f*T*1/a*V*L*1/d \quad (7)$$

When the component X is a cylinder block, the evaluation target site E is a site that receives a large vibration, such as a portion having a cylinder (cylinder liner), and the defect detection unit 11 detects the defect group Kg as illustrated in FIG. 3 as a defect, the defect evaluation value calculation unit 15 may calculate the defect evaluation value B, for example, using the following Formula (8). That is, the right-side term for determination of Formula (8) is a term obtained by multiplying the term for determination of Formula (7) by the squared value of the density ρ of the defects K included in the defect group Kg. In the following Formula (8), the larger the value of the density ρ of the defects K included in the defect group Kg, the higher the defect evaluation value B.

[Formula 8]

$$B \propto A*f*T*1/a*V*L*1/d\rho^2 \quad (8)$$

The aggressive defect determination unit 16 illustrated in FIG. 1 compares the defect evaluation value B calculated by the defect evaluation value calculation unit 15 with a predetermined threshold thereby to determine whether or not the defect detected by the defect detection unit 11 is an aggressive defect. That is, when the defect evaluation value B is the predetermined threshold or more, the aggressive defect determination unit 16 determines that the defect is an aggressive defect. The predetermined threshold is a value that is set for each evaluation target site E in order to determine whether or not the defect is an aggressive defect. In the case in which a determination formula is set such that the defect evaluation value B becomes lower as the aggressive level of the defect is higher, the aggressive defect determination unit 16 may determine that the defect is an aggressive defect when the defect evaluation value B is a predetermined threshold or less.

Additionally or alternatively, the aggressive defect determination unit 16 may classify, based on the defect evaluation value B, the defect into any one of a plurality of evaluation classes that represent the aggressive levels of defects (levels of importance). For example, the aggressive defect determination unit 16 may classify, based on the defect evaluation value B, the defect into any of three classes: (1) a class of non-problematic defects (defects that are not aggressive defects); (2) a class of defects that are aggressive defects but can be repaired, such as by welding (e.g., when the depth d from the surface is small and the defect evaluation value B takes a value between (1) and (3)); and (3) a class of aggressive defects that cannot be repaired. The aggressive defect determination unit 16 may also classify the defect into any of a plurality of classes (e.g., 5 classes) based on the defect evaluation value B, regardless of whether or not the defect can be repaired.

The information output unit 17 outputs the result of determination made by the aggressive defect determination unit 16 to the user interface 2. Specifically, when a determination is made that the defect is an aggressive defect, as illustrated in FIG. 4, the information output unit 17 outputs an image representing the shape of the component X and the position of a defect K with respect to the surface of the component X to the image display unit 21 of the user interface 2. Additionally or alternatively, the information output unit 17 may output, to the audio output unit 22 of the user interface 2, audio information that the component X has an aggressive defect.

In FIG. 4(*a*), the outer shape of the component X and the shapes of the surfaces of approximately cylindrical cylinder liners, which are the evaluation target sites E, are displayed. The cylinder liners, which are the evaluation target sites E, are integrally formed with the component X, which is a cast product. In addition, in the image illustrated in FIG. 4(*a*), circles indicating the positions of four defects K with respect to the surfaces of the evaluation target sites E are illustrated. The information output unit 17 may highlight the marks indicating the positions of the defects K by displaying them in color or by blinking them. Additionally or alternatively, the information output unit 17 may change the display forms of the positional information of the defects K, such as by changing the color of the marks indicating the positions of the defects K, in accordance with a plurality of evaluation classes representing the aggressive levels of the defects K (levels of importance). Additionally or alternatively, the image display unit 21 may display only the position of a defect K corresponding to a particularly high evaluation class (such as an evaluation class having the highest defect evaluation value B) in accordance with the selection made by the user U.

Additionally or alternatively, as illustrated in FIG. 4(*b*), in order to improve the visibility of the evaluation target sites E, the information output unit 17 may raise the transparency of the outer shape's upper portion of the component X as compared with other portions, as illustrated by the dashed-two dotted lines, and display the portion having the raised transparency on the image display unit 21. That is, the information output unit 17 makes the portion around the evaluation target sites E transparent and displays the portion on the image display unit 21. Additionally or alternatively, in FIG. 4(*b*), the image display unit 21 may color and highlight the evaluation target sites E for display.

Additionally or alternatively, when a determination is made that the defects are aggressive defects, the information output unit 17 may output the usage state information values of the evaluation target sites E to the image display unit 21 or audio output unit 22 of the user interface 2.

A procedure of the quality evaluation method for the component X executed by the quality evaluation device 10 will then be described with reference to FIG. 5.

First, in step S1, the defect detection unit 11 detects defects based on the detection results obtained by the non-destructive inspection method of the inspection device 1. Then, in step S2, the feature amount extraction unit 12 extracts the feature amounts of the defects from the detection information of the defects.

Then, in step S3, the quality evaluation device 10 creates a defect list in which the feature amounts are associated with the detected defects and stores the defect list in a database.

Then, in step S4, the evaluation target site specifying unit 13 specifies an evaluation target site E in which a defect is present. Further, in step S5, the usage state information value acquisition unit 14 acquires the usage state information values of the evaluation target site E. Further, in step S6, the defect evaluation value calculation unit 15 specifies a determination formula corresponding to the evaluation target site E. Then, in step S7, the defect evaluation value calculation unit 15 calculates the defect evaluation value B by substituting the feature amounts, the usage state information values, etc. into the determination formula.

Then, in step S8, the aggressive defect determination unit 16 determines whether or not the defect evaluation value B calculated in step S7 is a predetermined threshold or more. When the defect evaluation value B is less than the predetermined threshold, the quality evaluation device 10 advances the process to step S10. When the defect evaluation value B is the predetermined threshold or more, the aggressive defect determination unit 16 determines in step S9 that the defect to be evaluated is an aggressive defect, and advances the process to step S10.

In step S10, the quality evaluation device 10 determines whether or not all the defects in the defect list created in step S3 have been evaluated. When all the defects in the defect list have not been evaluated, the quality evaluation device 10 returns the process to step S4. When all the defects in the defect list have been evaluated, the quality evaluation device 10 advances the process to step S11.

In step S11, the quality evaluation device 10 outputs the information on the evaluated defects to the user interface 2 and then concludes the process.

As described above, the quality evaluation device 10 according to the present embodiment extracts one or more feature amounts from detection information of a defect obtained by a non-destructive inspection method, specifies the evaluation target site E in which the defect is present in the component X, and acquires one or more usage state information values associated with the evaluation target site E. The usage state information values are estimated values representing physical characteristics of the evaluation target site E when the component X is used. Then, the quality evaluation device 10 determines, based at least on the one or more feature amounts and the one or more usage state information values, whether or not the defect is an aggressive defect. This allows the quality evaluation device 10 to evaluate the quality of the component in accordance with the expected usage state for each of evaluation target sites E in which defects are present, and it is possible to improve the accuracy in determining whether or not the defect is an aggressive defect.

In addition, the one or more usage state information values are one or more of the estimated pressure (p) applied to the evaluation target site E when the component X is used, the estimated stress (F) generated in the evaluation target site E when the component X is used, the frequency (f) of predicted vibration of the evaluation target site E when the component X is used, the amplitude (A) of the predicted vibration, and the estimated temperature (t) of the evaluation target site E when the component X is used.

This allows the quality evaluation device 10 to evaluate the quality of the component in accordance with the expected specific usage states (the estimated pressure (p), the estimated stress (F), the frequency (f) of the predicted vibration, the amplitude (A) of the predicted vibration, and the estimated temperature (t)) for each of evaluation target sites E in which defects are present, and it is possible to improve the accuracy in determining whether or not the defect is an aggressive defect.

In addition, the quality evaluation device 10 calculates the defect evaluation value B of the defect based at least on the one or more feature amounts and the one or more usage state information values and compares the defect evaluation value B with a predetermined threshold thereby to determine whether or not the defect is an aggressive defect. This allows the quality evaluation device 10 to clearly determine whether or not the defect is an aggressive defect by using the calculated defect evaluation value B.

In addition, the quality evaluation device 10 calculates a load time at which any of the usage state information values becomes a predetermined value or more within a predetermined period of use of the component X; and calculates the defect evaluation value B based at least on the one or more feature amounts, the one or more usage state information values, and the load time. Through this operation, the defect evaluation value B is calculated in accordance with the time when the load is particularly applied to the evaluation target site E of the component X, and it is therefore possible to improve the accuracy in determining whether or not the defect is an aggressive defect.

In addition, the quality evaluation device 10 classifies the defect into any one of a plurality of evaluation classes based on the defect evaluation value. This allows the user U to clearly determine the aggressive level of the defect present in the component X. Moreover, the user U can select and inspect only a defect classified into the evaluation class having a particularly high aggressive level and preferentially repair the defect.

In addition, when the evaluation target site E includes, for example, a cooling water flow path or an oil flow path as a fluid flow path, the quality evaluation device 10 acquires the estimated pressure p of a fluid (cooling water or oil) flowing through the fluid flow path as one of the usage state information values and calculates the defect evaluation value B higher as the estimated pressure p is higher, as represented by the above-described Formulae (3) and (4). This allows the quality evaluation device 10 to calculate the defect evaluation value B in accordance with the effect which the pressure of the fluid flowing through the fluid flow path is predicted to have on the evaluation target site E, and when the defect evaluation value B is a predetermined threshold or more, the quality evaluation device 10 can determine that the defect is an aggressive defect.

In addition, when the evaluation target site E includes a connection portion by bolt joining, the quality evaluation device 10 acquires the estimated stress F generated in the evaluation target site E due to the bolt joining as one of the usage state information values and calculates the defect evaluation value B higher as the estimated stress F is higher, as represented by the above-described Formulae (5) and (6). This allows the quality evaluation device 10 to calculate the defect evaluation value B in accordance with the effect which the bolt joining is predicted to have on the evaluation target site E, and when the defect evaluation value B is a predetermined threshold or more, the quality evaluation device 10 can determine that the defect is an aggressive defect.

In addition, as represented by the above-described Formulae (5) to (8), the quality evaluation device 10 acquires the frequency f or amplitude A of the predicted vibration of the evaluation target site E as one of the usage state information values and calculates the defect evaluation value B higher as the frequency f or amplitude A of the predicted vibration is higher. This allows the quality evaluation device 10 to calculate the defect evaluation value B in accordance with the effect which the vibration when using the component X is predicted to have on the evaluation target site E, and when the defect evaluation value B is a predetermined threshold or more, the quality evaluation device 10 can determine that the defect is an aggressive defect.

In addition, the quality evaluation device 10 extracts the one or more feature amounts based at least on one of the position and size of the defect. This allows the quality of the component X to be evaluated in accordance with the position of the defect in the component X and the size of the region occupied by the defect, in addition to the usage state of each evaluation target site E in which the defect is present, and it is possible to improve the accuracy in determining whether or not the defect is an aggressive defect.

The quality evaluation device 10 extracts the depth of the position of the defect from the surface of the component X as one of the feature amounts. This allows the quality evaluation device 10 to extract a feature amount of the defect and determine whether or not the defect is an aggressive defect based on a situation in which the smaller the depth d of the position of the defect from the surface of the component X, the higher the possibility of problems such as oil leakage through the defect and exposure of the defect.

As illustrated in FIG. 3, when the evaluation target site E includes a plurality of defects K, the quality evaluation device 10 specifies the defect group Kg in which the density of the plurality of defects K is a predetermined value or more, detects the defect group Kg as the defect, and extracts the density of the plurality of defects K as one of the feature amounts. Through this operation, even when the aggressive level of each of the defects K is low, the quality evaluation device 10 can determine whether or not the defect group Kg detected as a defect is an aggressive defect based on the characteristics of the defect group Kg that the defects K may communicate with each other to form a larger defect.

The quality evaluation device 10 includes the information output unit 17 that outputs information to the user interface 2, and when a determination is made that the defect is an aggressive defect, the information output unit 17 outputs an image representing the shape of the component X and the position of the defect with respect to the surface of the component X to the user interface 2. This allows the user U to visually confirm the position of the defect determined to be an aggressive defect.

In addition, when a determination is made that the defect is an aggressive defect, the information output unit 17 outputs the one or more usage state information values of the evaluation target site E to the user interface 2. This allows the user U to confirm the usage state information of the evaluation target site E in which the aggressive defect is present.

In addition, the quality evaluation device 10 may extract the one or more feature amounts on the assumption that the component X is subjected to a predetermined process. This allows the quality evaluation device 10 to determine whether or not the defect is an aggressive defect in accordance with the process to be performed on the component X, and the user U can therefore adjust the process content in accordance with the result of a determination made by the quality evaluation device 10.

In addition, the quality evaluation device 10 may create a virtual model of the component X and acquire the one or more usage state information values based on a simulation result obtained by simulating the usage state of the virtual model. This makes it possible to acquire a more accurate usage state information value of the evaluation target site E and improve the accuracy in determining whether or not the defect is an aggressive defect.

In addition, the component X whose quality is evaluated by the quality evaluation device 10 is a cast product. This allows the quality evaluation device 10 to determine whether or not the defect generated in the cast product is an aggressive defect.

DESCRIPTION OF REFERENCE NUMERALS

2 User interface
10 Quality evaluation device
11 Defect detection unit
12 Feature amount extraction unit
13 Evaluation target site specifying unit
14 Usage state information value acquisition unit
16 Aggressive defect determination unit
17 Information output unit
K Defect
Kg Defect group
X Component

The invention claimed is:

1. A quality evaluation method for evaluating a quality of a cylinder block of an engine, the quality evaluation method comprising:
- performing a non-destructive inspection on the cylinder block, by an inspection device, to obtain at least one detection result;
- acquiring the at least one detection result, by a quality evaluation device, from the inspection device;
- detecting at least one defect present in the cylinder block, by the quality evaluation device, based on the at least one detection result;
- extracting one or more feature amounts, by the quality evaluation device, from detection information of the at least one defect;
- specifying at least one evaluation target site in which the at least one defect is present in the cylinder block, by the quality evaluation device, wherein the at least one evaluation target site includes an oil flow path, a cooling water flow path, a connection portion by bolt joining with a cylinder head, and a connection portion by bolt joining with a radiator;
- acquiring one or more usage state information values associated with the at least one evaluation target site, by the quality evaluation device,
  - wherein the one or more usage state information values comprise a value that indicates a degree of load applied to the at least one evaluation target site when the cylinder block is used;
- determining, based at least on the one or more feature amounts and the one or more usage state information values, by the quality evaluation device, whether the at least one defect is an aggressive defect;
- predicting whether the cylinder block is repairable based on the determination on whether the at least one defect is an aggressive defect; and
- when the at least one defect is determined to be an aggressive defect, outputting an image to a user interface to allow visual confirmation of a position of the at least one defect,
  - wherein the image represents a shape of the cylinder block and the position of the at least one defect with respect to a surface of the cylinder block.

2. The quality evaluation method according to claim 1, wherein the one or more usage state information values are one or more of an estimated pressure applied to the at least one evaluation target site when the cylinder block is used, an estimated stress generated in the at least one evaluation target site when the cylinder block is used, a frequency of predicted vibration of the at least one evaluation target site when the cylinder block is used, an amplitude of the predicted vibration, and an estimated temperature of the at least one evaluation target site when the cylinder block is used.

3. The quality evaluation method according to claim 1, wherein the quality evaluation device operates to:
- calculate a defect evaluation value of the at least one defect based at least on the one or more feature amounts and the one or more usage state information values; and
- compare the defect evaluation value with a predetermined threshold thereby to determine whether the at least one defect is an aggressive defect.

4. The quality evaluation method according to claim 3, wherein the quality evaluation device operates to:
- calculate a load time at which any of the usage state information values becomes a predetermined value or more within a predetermined period of use of the cylinder block; and
- calculate the defect evaluation value based at least on the one or more feature amounts, the one or more usage state information values, and the load time.

5. The quality evaluation method according to claim 3, wherein the quality evaluation device operates to classify the at least one defect into any one of a plurality of evaluation classes based on the defect evaluation value.

6. The quality evaluation method according to claim 3, wherein the quality evaluation device operates to:
- when the at least one evaluation target site includes a fluid flow path, acquire an estimated pressure of a fluid flowing through the fluid flow path as one of the usage state information values; and
- calculate the defect evaluation value higher as the estimated pressure is higher.

7. The quality evaluation method according to claim 3, wherein the quality evaluation device operates to:
- when the at least one evaluation target site includes a connection portion by bolt joining, acquire an estimated stress generated in the at least one evaluation target site due to the bolt joining as one of the usage state information values; and calculate the defect evaluation value higher as the estimated stress is higher.

8. The quality evaluation method according to claim 3, wherein the quality evaluation device operates to:

acquire as one of the usage state information values a frequency or an amplitude of predicted vibration of the at least one evaluation target site when the cylinder block is used; and calculate the defect evaluation value higher as the frequency or amplitude of the predicted vibration is higher.

9. The quality evaluation method according to claim 1, wherein the quality evaluation device operates to extract the one or more feature amounts based at least on one of a position and a size of the at least one defect.

10. The quality evaluation method according to claim 9, wherein the quality evaluation device operates to extract a depth of the position of the at least one defect from a surface of the cylinder block as one of the feature amounts.

11. The quality evaluation method according to claim 1, wherein the quality evaluation device operates to:

when the at least one evaluation target site includes a plurality of defects, specify at least one defect group in which density of the plurality of defects is a predetermined value or more;

detect the at least one defect group as the at least one defect; and extract the density as one of the feature amounts.

12. The quality evaluation method according to claim 1, wherein the quality evaluation device operates to:

when a determination is made that the at least one defect is an aggressive defect, output the one or more usage state information values of the at least one evaluation target site to the user interface.

13. The quality evaluation method according to claim 1, wherein the quality evaluation device operates to extract the one or more feature amounts on an assumption that the cylinder block is subjected to a predetermined process.

14. The quality evaluation method according to claim 1, wherein the quality evaluation device operates to:

create a virtual model of the cylinder block; and acquire the one or more usage state information values based on a simulation result obtained by simulating a usage state of the virtual model.

15. The quality evaluation method according to claim 1, wherein the cylinder block is a cast product.

* * * * *